US012608622B1

(12) United States Patent
Dicastro et al.

(10) Patent No.: US 12,608,622 B1
(45) Date of Patent: Apr. 21, 2026

(54) REPLAY BUFFER INTEGRATION FOR GROUP-BASED RELATIVE POLICY OPTIMIZATION IN MACHINE LEARNING

(71) Applicant: INTUIT INC., Mountain View, CA (US)

(72) Inventors: Shirli Dicastro, Kfar Saba (IL); Shai Ardazi, Petah Tikva (IL); Ofir Ben Shoham, Hod Hasharon (IL); Gidi Zilbar, Ein Shemer (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/255,431

(22) Filed: Jun. 30, 2025

(51) Int. Cl.
   *G06N 3/092* (2023.01)
   *G06N 3/047* (2023.01)
   *G06N 20/00* (2019.01)
(52) U.S. Cl.
   CPC ............. *G06N 3/092* (2023.01); *G06N 3/047* (2023.01); *G06N 20/00* (2019.01)
(58) Field of Classification Search
   CPC ......... G06N 3/092; G06N 3/047; G06N 20/00
   See application file for complete search history.

(56) References Cited

U.S. PATENT DOCUMENTS

| 2020/0151562 A1* | 5/2020 | Pietquin | .................. | G06N 3/092 |
| 2021/0103806 A1* | 4/2021 | Blaichman | ............. | G11C 16/08 |
| 2024/0256882 A1* | 8/2024 | Tang | ...................... | G06N 3/006 |

OTHER PUBLICATIONS

MK, "Exploring Importance Sampling in Reinforcement Learning" Oct. 7, 2023, Medium.com, accessed online Aug. 18, 2025 at <https://medium.com/@amagwka/exploring-importance-sampling-in-reinforcement-learning-38fdf1b0c58c> (Year: 2023).*
"Log Probability," Wikipedia, May 19, 2024, accessed online at <web.archive.org/web/20240519001316/https://en.wikipedia.org/wiki/Log_probability> (Year: 2024).*
Shao et al., "DeepSeekMath: Pushing the Limits of Mathematical Reasoning in Open Language Models" Apr. 27, 2024, arxiv.org, arXiv:2402.03300 (Year: 2024).*
Li et al. "RePO: Replay-Enhanced Policy Optimization" Jun. 11, 2025, arxiv.org, <arxiv.org/abs/2506.09340> (Year: 2025).*
Noukhovitch et al., "Asynchronous RLHF: Faster And More Efficient Off-Policy RL For Language Models," Apr. 26, 2025, arxiv. org, doi.org/10.48550/arXiv.2410.18252 (Year: 2025).*

* cited by examiner

*Primary Examiner* — James D. Rutten
(74) *Attorney, Agent, or Firm* — Patterson + Sheridan, LLP

(57) ABSTRACT

Aspects of the present disclosure provide techniques for optimizing a policy model in a reinforcement learning framework, involving generating output completions for an input query, evaluating the output completions with a reward model, and storing related data in a replay buffer. Certain aspects include computing advantages for output completions sampled from the replay buffer and modifying policy model parameters based on these advantages to enhance model performance.

15 Claims, 5 Drawing Sheets

100

SERVER 110

POLICY MODEL OPTIMIZATION ENGINE 112

REWARD MODEL 113

REPLAY BUFFER 114

POLICY MODEL 116

REQUEST 124

NETWORK 150

RESPONSE 126

CLIENT 120

USER INTERFACE 122

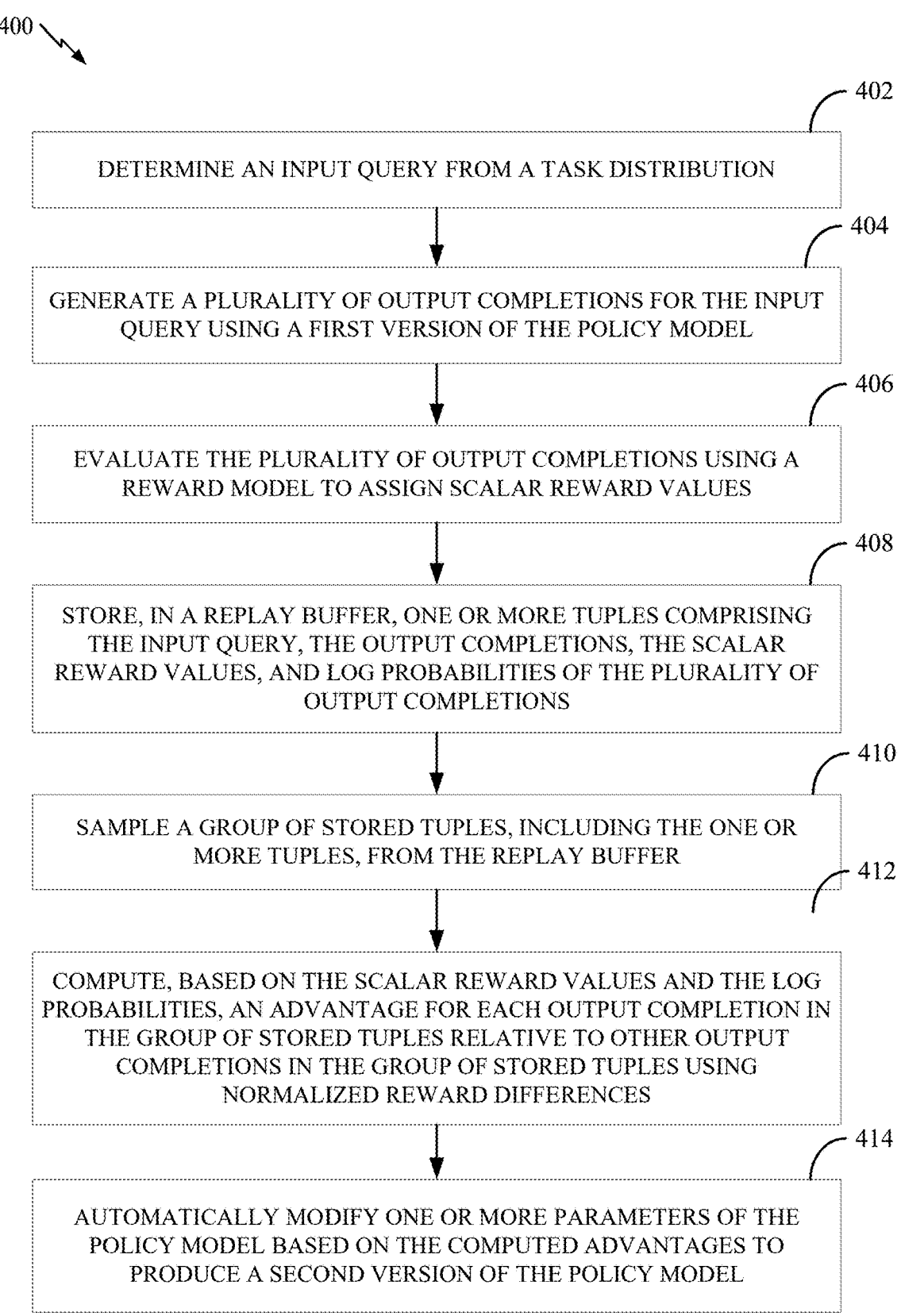

400

402

DETERMINE AN INPUT QUERY FROM A TASK DISTRIBUTION

404

GENERATE A PLURALITY OF OUTPUT COMPLETIONS FOR THE INPUT QUERY USING A FIRST VERSION OF THE POLICY MODEL

406

EVALUATE THE PLURALITY OF OUTPUT COMPLETIONS USING A REWARD MODEL TO ASSIGN SCALAR REWARD VALUES

408

STORE, IN A REPLAY BUFFER, ONE OR MORE TUPLES COMPRISING THE INPUT QUERY, THE OUTPUT COMPLETIONS, THE SCALAR REWARD VALUES, AND LOG PROBABILITIES OF THE PLURALITY OF OUTPUT COMPLETIONS

410

SAMPLE A GROUP OF STORED TUPLES, INCLUDING THE ONE OR MORE TUPLES, FROM THE REPLAY BUFFER

412

COMPUTE, BASED ON THE SCALAR REWARD VALUES AND THE LOG PROBABILITIES, AN ADVANTAGE FOR EACH OUTPUT COMPLETION IN THE GROUP OF STORED TUPLES RELATIVE TO OTHER OUTPUT COMPLETIONS IN THE GROUP OF STORED TUPLES USING NORMALIZED REWARD DIFFERENCES

414

AUTOMATICALLY MODIFY ONE OR MORE PARAMETERS OF THE POLICY MODEL BASED ON THE COMPUTED ADVANTAGES TO PRODUCE A SECOND VERSION OF THE POLICY MODEL

FIG. 4

TO NETWORK
510

TO NETWORK
510

REPLAY BUFFER INTEGRATION FOR GROUP-BASED RELATIVE POLICY OPTIMIZATION IN MACHINE LEARNING

INTRODUCTION

The present disclosure pertains to the field of machine learning, specifically focusing on reinforcement learning techniques. The disclosure introduces a replay buffer mechanism into the Grouped Relative Policy Optimization (GRPO) framework, facilitating enhanced training efficiency and computational resource management by decoupling the generation and optimization phases, thereby addressing issues related to sample inefficiency and high computational costs.

BACKGROUND

In the field of machine learning, particularly in the domain of reinforcement learning (RL), the optimization of policy models such as large language models (LLMs) presents significant technical challenges. Reinforcement learning involves the iterative improvement of models based on feedback from their environment, typically in the form of computed rewards. The Grouped Relative Policy Optimization (GRPO) algorithm is one technique in this domain that utilizes group-relative advantages to optimize policy models. GRPO involves comparing multiple generated outputs for the same input prompt to determine normalized advantages, followed by policy model updates based on the determined advantages. However, the GRPO algorithm requires fresh inferences to be generated using the policy model for each policy model update, leading to inefficiencies and high computational costs. Furthermore the use of fresh inferences for each policy model optimization leads to what is often referred to as the "sample waste" problem.

What is needed is a system that addresses these inefficiencies by solving the issues of slow learning and high compute costs, as well as reducing sample waste.

BRIEF SUMMARY

The following description and the related drawings set forth in detail certain illustrative features of one or more embodiments.

In one aspect, the disclosed technology pertains to a method for optimizing a policy model within a reinforcement learning framework. This method involves determining an input query from a task distribution and generating multiple output completions using a first version of the policy model. These output completions are evaluated using a reward model to assign scalar reward values, which are then stored in a replay buffer along with the input query, log probabilities, and other relevant data. The method further includes sampling stored tuples from the replay buffer, computing advantages for each output completion using normalized reward differences, and modifying the policy model parameters based on these computed advantages to produce an updated version of the policy model.

One object of the technology is to enhance the efficiency of training machine learning models such as large language models by decoupling the generation phase from the model optimization phase. This separation allows for asynchronous execution, where the generation of output completions and the evaluation of such output completions (e.g., to determine rewards and/or advantages) can be performed independently of the optimization process. As a result, multiple optimization steps can be conducted without necessitating new inferences at each step, thereby improving training speed, sample reuse, and computational efficiency.

In an embodiment, the method includes performing the generation phase and the optimization phase as separate asynchronous phases, with independent schedulers controlling the frequency of each phase. This configuration allows for adaptive learning schedules, enabling the system to optimize resource allocation and improve overall performance.

In yet another aspect, the technology includes a system comprising one or more processors and a memory storing instructions that, when executed, perform one or more of the method steps described herein. This system is designed to optimize a policy model by leveraging the replay buffer mechanism, which facilitates the reuse of data across multiple optimization steps, thereby addressing the issue of sample inefficiency commonly encountered in reinforcement learning frameworks.

In still another aspect, the technology includes a non-transitory computer readable medium storing instructions that, when executed by one or more processors of a computing system, cause the computing system to perform one or more of the method steps described herein.

In an embodiment, the policy model comprises a machine learning model, such as a language processing model, where the output completions include natural language responses generated based on the input query. This embodiment highlights the applicability of the disclosed technology to language model fine-tuning, where the replay buffer mechanism and decoupled phases contribute in a particular manner to more efficient and scalable training processes.

BRIEF DESCRIPTION OF THE DRAWINGS

The appended figures depict certain aspects of the one or more embodiments and are therefore not to be considered limiting of the scope of this disclosure.

FIG. 4 depicts example operations related to optimizing a policy model in a reinforcement learning framework.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer-readable mediums for automated content generation in a brand voice through machine learning.

The disclosed technology pertains to a method and system for optimizing a policy model within a reinforcement learning framework, specifically focused on optimizing machine learning models such as large language models (LLMs). Aspects of the present disclosure introduce a replay buffer mechanism into the Grouped Relative Policy Optimization (GRPO) framework, allowing for the storage and reuse of grouped outputs, rewards, and log-probabilities across multiple optimization steps. The replay buffer mechanism addresses inefficiencies associated with conventional GRPO techniques that involve fresh inferences for each policy model update and lead to high computational costs and sample waste.

In contrast to prior techniques, aspects of the present disclosure decouple the generation phase from the optimization phase. This separation allows for asynchronous execution, where the generation of output completions and their evaluation can be performed independently of the optimization process. As a result, multiple optimization steps can be conducted without necessitating new inferences at each optimization step, thereby improving training speed and computational efficiency. The use of independent schedulers for each phase further enhances the flexibility and adaptability of the training process, allowing for optimized resource allocation and improved overall performance.

The technical improvements accomplished by techniques described herein are significant. Firstly, the introduction of a replay buffer for grouped outputs enables the reuse of generated data across multiple optimization steps, effectively reducing sample waste. This reuse of data not only enhances the efficiency of the training process but also contributes to a reduction in computational resources required for model optimization. By storing and reusing previously generated outputs, the system minimizes the need for repeated inference, thereby addressing the "sample waste" problem inherent in traditional GRPO methods.

Secondly, the decoupling of the generation and optimization phases allows for a more efficient and scalable training process. The asynchronous execution of these phases, controlled by independent schedulers, enables the system to adapt to varying computational demands and optimize resource allocation. This flexibility is particularly beneficial for large-scale machine learning model training operations such as LLM fine-tuning, where computational efficiency and training speed are critical. By allowing multiple optimization steps to be performed without the need for new inference at each step, the disclosed technology significantly enhances the practicality and scalability of reinforcement learning techniques applied to machine learning models such as LLMs.

Figure 1:
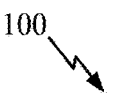
FIG. 1 is a block diagram of a computing environment related to optimizing a policy model in a reinforcement learning framework.

Example Computing Components Related to
Optimizing a Policy Model in a Reinforcement
Learning Framework FIG. 1 shows a system 100 for optimizing a policy model in a reinforcement learning framework. The system 100 comprises a server 110, which includes a policy model optimization engine 112, a reward model 113, a replay buffer 114, and a policy model 116. The server 110 is configured to process requests and responses in conjunction with a client 120.

The server 110 may function as an application server within the system 100, utilizing the policy model 116 to process incoming requests and generate corresponding responses, such as in connection with use of a software application. The server 110 is configured to handle requests from client devices, such as client 120, which may be connected to server 110 via a network 150 (e.g., which may represent any connection over which data may be transmitted, such as the Internet). Upon receiving a request 124 from the client 120, the server 110 employs the policy model 116 to generate an output completion, such as a natural language response or other type of response, based on the request. This output completion may be used to provide a response 126 back to the client 120 (e.g., which may be the output completion itself or a response derived from the output completion).

The server 110 is further equipped to perform optimization of the policy model 116 through a multi-phase process, as described in more detail below with respect to FIG. 3. The policy model optimization engine 112 within the server 110 is responsible for optimizing the policy model 116. It utilizes the replay buffer 114 to store and manage data, enabling efficient reuse of samples during the optimization process. The replay buffer 114 stores tuples comprising, for example, input queries, output completions, scalar reward values, and log probabilities, facilitating multiple optimization steps from the same data. For instance, during a generation phase, policy model optimization engine 112 may sample input queries from a task distribution (e.g., input queries received from clients, such as via request 124, and/or other stored and/or generated input queries) and, for each such input query, generate multiple output completions using policy model 116. The task distribution may refer to the distribution of tasks for which policy model 116 may be used to generate responses. Policy model optimization engine 112 may determine rewards for the output completions using techniques described herein (e.g., using reward model 113), and may store the output completions and the rewards in association with the corresponding input query in replay buffer 114.

A replay buffer is a data structure used to store and manage data (e.g., generated in connection with the training of a policy model in a reinforcement learning framework). It is designed to facilitate the reuse of previously generated data across multiple steps (e.g., multiple optimization steps), thereby enhancing training efficiency and reducing computational costs. The replay buffer 114 may store data in the form of tuples or other forms. By maintaining a diverse set of samples, the replay buffer allows for the sampling of overlapping data across different optimization phases, enabling the system to leverage historical data for more effective policy model updates. This mechanism addresses the issue of sample waste by minimizing the need for fresh inferences at each optimization step, contributing to a more efficient and scalable training process.

Reward model 113 may, for example, comprise a machine learning model or other mathematical or rules-based model configured to output rewards for output completions. In the context of a GRPO framework, a reward model functions as a critical component for evaluating the quality of output completions generated by a policy model. The reward model is designed to assign scalar reward values to each output completion based on its performance relative to a predefined set of criteria or objectives. These criteria may include factors such as relevance, accuracy, coherence, or any other metric deemed pertinent to the task at hand. The rewards model 113 may be implemented using various types of machine learning models, each offering distinct capabilities for evaluating output completions. These models may include, but are not limited to, neural networks, transformer models, support vector machines, decision trees, ensemble models, Bayesian networks, reinforcement learning models, regression models, and/or the like. Each of these models can be trained (e.g., through a supervised learning process) using historical data to accurately assign reward values to output completions, thereby facilitating the optimization of the policy model within the reinforcement learning framework.

The reward model 113 may operate by receiving an output completion as input and processing it through a series of evaluations to determine its alignment with the desired outcomes. This evaluation process may involve comparing the output completion against a reference dataset, applying heuristic rules, or utilizing a machine learning model trained to predict reward values based on historical data. The resulting scalar reward value reflects the degree to which the output completion meets the specified criteria, providing a quantitative measure of its quality.

Policy model optimization engine 112 may also store additional information in replay buffer 114, such as log probabilities and, in some embodiments, computed advantages. In the GRPO framework, the rewards are used to compute advantages for each output completion within a group. These advantages are determined by comparing the scalar reward values of the output completions, allowing the system to identify which completions perform better relative to others in the same group. The computed advantages are then utilized to guide the optimization of the policy model, enabling it to learn from past performance and improve its ability to generate high-quality output completions in future iterations. In some embodiments the advantages are computed during the generation phase and stored in replay buffer 114, while in other embodiments the advantages are not stored in replay buffer 114 and are instead computed based on data sampled from replay buffer 114 during the model optimization phase.

During the optimization phase, policy model optimization engine 112 may sample a group of stored tuples from the replay buffer 114 and compute advantages for each output completion relative to other output completions in the group using techniques described herein (or the advantages may have already been computed during the generation phase and stored in replay buffer 114). This process may involve utilizing normalized reward differences to determine the relative advantages of the output completions, which are then used to modify the parameters of the policy model 116. For example, modifying the parameters of the policy model 116 may be based on evaluating an objective function based on the determined advantages of the output completions and iteratively modifying one or more parameters of policy model 116 through a supervised learning process. The server 110, through its policy model optimization engine 112, facilitates the iterative improvement of the policy model 116, thereby enhancing the model's performance in generating accurate and contextually relevant responses to client requests.

Policy model 116 may, for example, be a machine learning model configured to receive input queries and to generate outputs in response. For example, policy model 116 may be a neural network, a transformer model, a language processing machine learning model such as an LLM, a tree-based model such as a gradient boosted tree or random forest model, a regression model, a support vector machine, a Bayesian belief network, a diffusion model, a convolutional neural network (CNN), a recurrent neural network (RNN), a generative adversarial network (GAN), a deep belief network (DBN), a Boltzmann machine, a Markov decision process (MDP), a reinforcement learning model, and/or the like. In other embodiments, policy model 116 may be a rules-based model that is configured to evaluate inputs to determine outputs according to rules and/or logic.

Policy model 116 may, for example, have been trained in advance and/or on an ongoing basis through supervised learning techniques. Supervised learning generally involves utilizing a labeled dataset, where each input data point is paired with a corresponding target output. During the training process in supervised learning, the model processes the input data and generates predictions, which are then compared to the actual target outputs using an objective function. The objective function quantifies the difference between the predicted outputs and the true outputs, providing a measure of the model's performance (e.g., in terms of loss). The model's parameters are iteratively adjusted to minimize this loss, typically through optimization algorithms such as gradient descent, gradient ascent, and/or the like. By continuously updating the model's parameters based on the computed gradients of the objective function, the model learns to map inputs to outputs more accurately. This iterative process continues until the model achieves a satisfactory level of accuracy on the training data, at which point it is considered trained and can be evaluated on unseen data to assess its generalization capabilities. In the present case, improved GRPO techniques described herein may be used to train policy model 116.

Server 110 may operate as a central component within the system 100, enabling efficient processing of requests and generation of responses, while simultaneously optimizing the policy model 116 to improve its capabilities over time. The server's ability to leverage the replay buffer 114 for data reuse across multiple optimization steps contributes to the overall efficiency and scalability of the system, particularly in the context of large-scale language model fine-tuning. It is noted that in alternative embodiments, optimization of policy model 116 and use of policy model 116 to handle requests from clients may be performed on separate computing devices.

The client 120 includes a user interface 122, which facilitates interaction with the system 100. For example, a user may provide an input query via a user interface 122, such as requesting information, content, assistance, and/or the like. The client 120 sends a request 124 (e.g., including an input query received via user interface 122) to the server 110 via a network 150.

The network 150 enables communication between the client 120 and the server 110, allowing the server 110 to process the request 124 and generate a response 126 (e.g., using policy model 116), which is then transmitted back to the client 120. In some aspects, response 126 may be displayed via user interface 122, such as providing the user with the requested information, content, assistance, and/or the like. In other aspects, request 124 and response 126 may not directly relate to input from a user, and may relate to automated processes performed by software components.

GRPO Techniques

Figure 2:
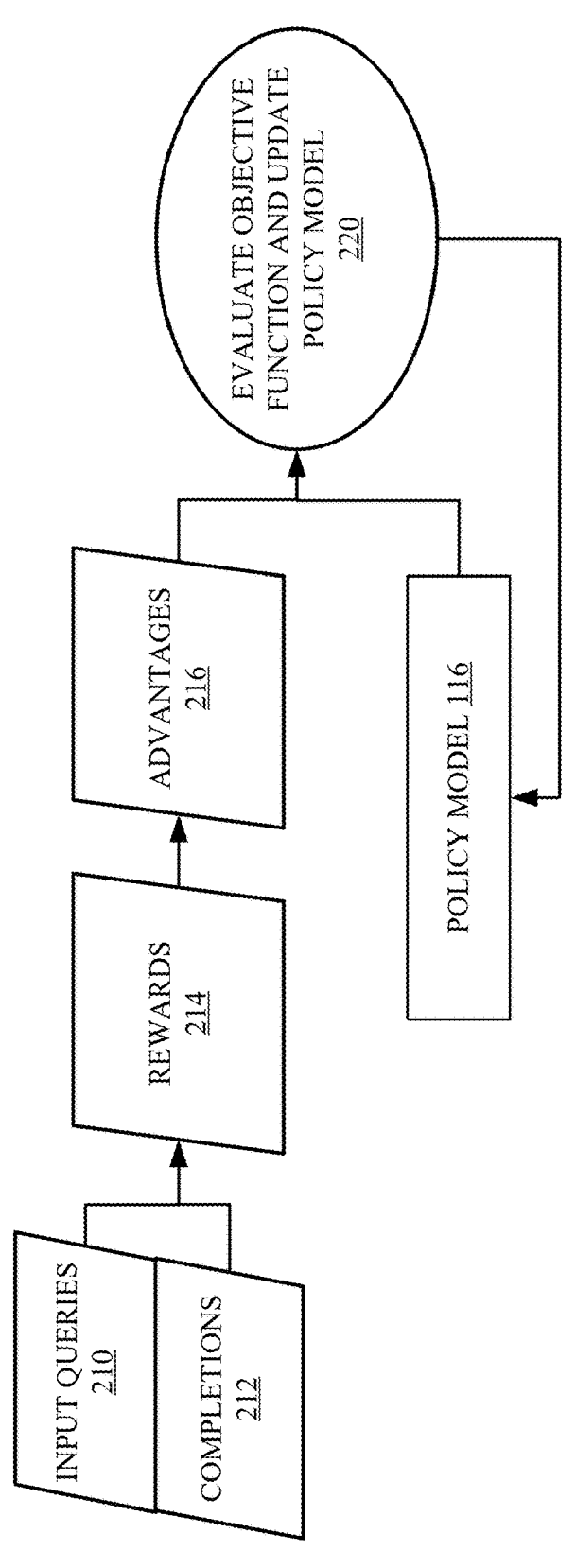
FIG. 2 is an illustration of grouped relative policy optimization.

FIG. 2 is an illustration 200 of a technique for optimizing a policy model within a reinforcement learning framework according to GRPO techniques. For example, illustration 200 may depict a GRPO technique in which the generation and optimization phases are not separated, leading to technical limitations that are overcome by techniques described herein, such as with respect to FIG. 3 below. Illustration 200 includes policy model 116 of FIG. 1.

The process depicted in illustration 200 begins with input queries 210, which are derived from a task distribution. For example, the task distribution may refer to a range of possible tasks that can be accomplished using policy model

116 of FIG. 1, and input queries 210 may be samples from a set of stored input queries, such as including input queries previously provided by one or more users, input queries generated by one or more experts or developers, input queries automatically generated (e.g., using a language processing machine learning model such as an LLM), and/or the like. These input queries 210 are used to generate completions 212, which represent a plurality of output completions for each input query. For example, policy (e.g., representative of all of input queries 210), the system samples a group of outputs (e.g., representing a subset of completions 220) from the old policy (e.g., the version of policy model 116, prior to optimization) and then optimizes the policy model (e.g., representing a candidate optimized version of policy model 116) by maximizing an objective function (e.g., at step 220). In an example, the objective function is represented as:

$$\mathcal{J}_{GRPO}(\theta) = \mathbb{E}\left[q \sim P(Q), \{o_i\}_{i=1}^{G} \sim \pi_{old}(\cdot|q)\right]$$

$$\left[\frac{1}{G}\sum_{i=1}^{G}\left(\min\left(\frac{\pi_\theta(o_i|q)}{\pi_{old}(o_i|q)}A_i, \text{clip}\left(\frac{\pi_\theta(o_i|q)}{\pi_{old}(o_i|q)}, 1-\varepsilon, 1+\varepsilon\right)A_i\right) - \beta D_{KL}(\pi_\theta\|\pi_{ref})\right)\right]$$

$$\mathcal{D}_{KL}(\pi_\theta\|\pi_{ref}) = \frac{\pi_{ref}(o_i|q)}{\pi_\theta(o_i|)} - \log\frac{\pi_{ref}(o_i|q)}{\pi_\theta(o_i|q)} - 1$$

model 116 may be used to generate completions 212 based on input queries 210 (e.g., by providing input queries 210 as inputs to policy model 116 and receiving completions 212 as outputs from policy model 116 in response to input queries 210). In some aspects, multiple completions 212 are generated for each individual input query 210.

The completions 212 are evaluated, such as using reward model 113 of FIG. 1, to assign scalar reward values, which are represented as rewards 214. These rewards 214 are then utilized to compute advantages 216 for each output completion. The advantages 216 are calculated based on the scalar reward values and are used to determine the relative performance of each output completion within a group.

The computation of advantages in the GRPO framework is a critical component for optimizing policy models, particularly in the context of reinforcement learning. The advantage computation process involves determining the relative performance of each output completion within a group, based on the scalar reward values assigned to those completions.

The computed advantage reflects the relative performance of an output completion compared to the average performance of the group (e.g., based on scalar rewards). A positive advantage indicates that the output completion performed better than the average, while a negative advantage suggests it performed worse.

These computed advantages are then utilized to guide the optimization of the policy model 116. The policy model parameters are adjusted based on the advantages, such as through a gradient ascent step based on evaluation of an objective function, to enhance the model's ability to generate high-quality output completions in future iterations. This process allows the policy model to learn from past performance and improve its decision-making capabilities over time.

The evaluation of the objective function and the subsequent update of the policy model are performed at the evaluate objective function and update policy model step 220. For example, step 220 may receive the advantages 216 and the policy model 116 and may facilitate the modification of the policy model parameters to produce an optimized version of the policy mode 116. The updated policy model 116 may then be fed back into the system to continue the optimization process and/or for use in generating new responses to requests from clients.

For example, in conventional GRPO, for each query (e.g., representative of an input query 210) in a set of queries Q In the above equation, $\mathcal{J}_{GRPO}(\theta)$ represents the objective function, $\mathbb{E}$ is the expected value (e.g., a statistical measure that represents the average outcome of a random variable, weighted by the probabilities of each possible outcome), $\varepsilon$ and $\beta$ are hyper-parameters, and $A_i$ is the advantage, computed using a group of rewards corresponding to the outputs within each group:

$$A_i = \frac{r_i - \text{mean}(\{r_1, r_2, \ldots, r_G\})}{std(\{r_1, r_2, r_G\})}$$

The function P(Q) may be used to evaluate the relative performance of different output completions within the group, contributing to the computation of advantages for optimizing the policy model. The variable G in the above equation may represent the number of output completions generated for each input query during the generation phase. Furthermore, in the above equation $\mathcal{D}_{KL}(\pi_\theta\|\pi_{ref})$ represents a KL regularization term for computing the KL divergence between the current policy $\pi_\theta$ and a reference policy $\pi_{ref}$. Furthermore, min represents a minimum function that returns the minimum of a set of value, clip represents a clip function used to limit the values of a variable to being within a specified range, log may represent a log probability, mean represents a mean function, and std represents a standard deviation function.

In the conventional GRPO techniques represented by illustration 200, the generation and optimization phases are not separated, leading to several technical limitations. One primary disadvantage of this approach is the requirement for fresh inferences to be generated for each policy model update. This necessity results in significant inefficiencies, as it demands high computational resources and time for each iteration of the optimization process. The lack of separation between the generation and optimization phases means that every update cycle involves generating new output completions (e.g., completions 212), which contributes to sample waste. This problem arises because the system does not effectively reuse previously generated data, leading to redundant computations and increased computational costs. Consequently, the conventional GRPO approach is less efficient and more resource-intensive, particularly when applied to training large-scale machine learning models such as LLMs. These technical challenges are addressed by the techniques described herein, such as below with respect to FIG. 3, in which a replay buffer mechanism is introduced and the generation and optimization phases are decoupled to enhance training efficiency and computational resource management.

Improved GRPO Techniques

Figure 3:
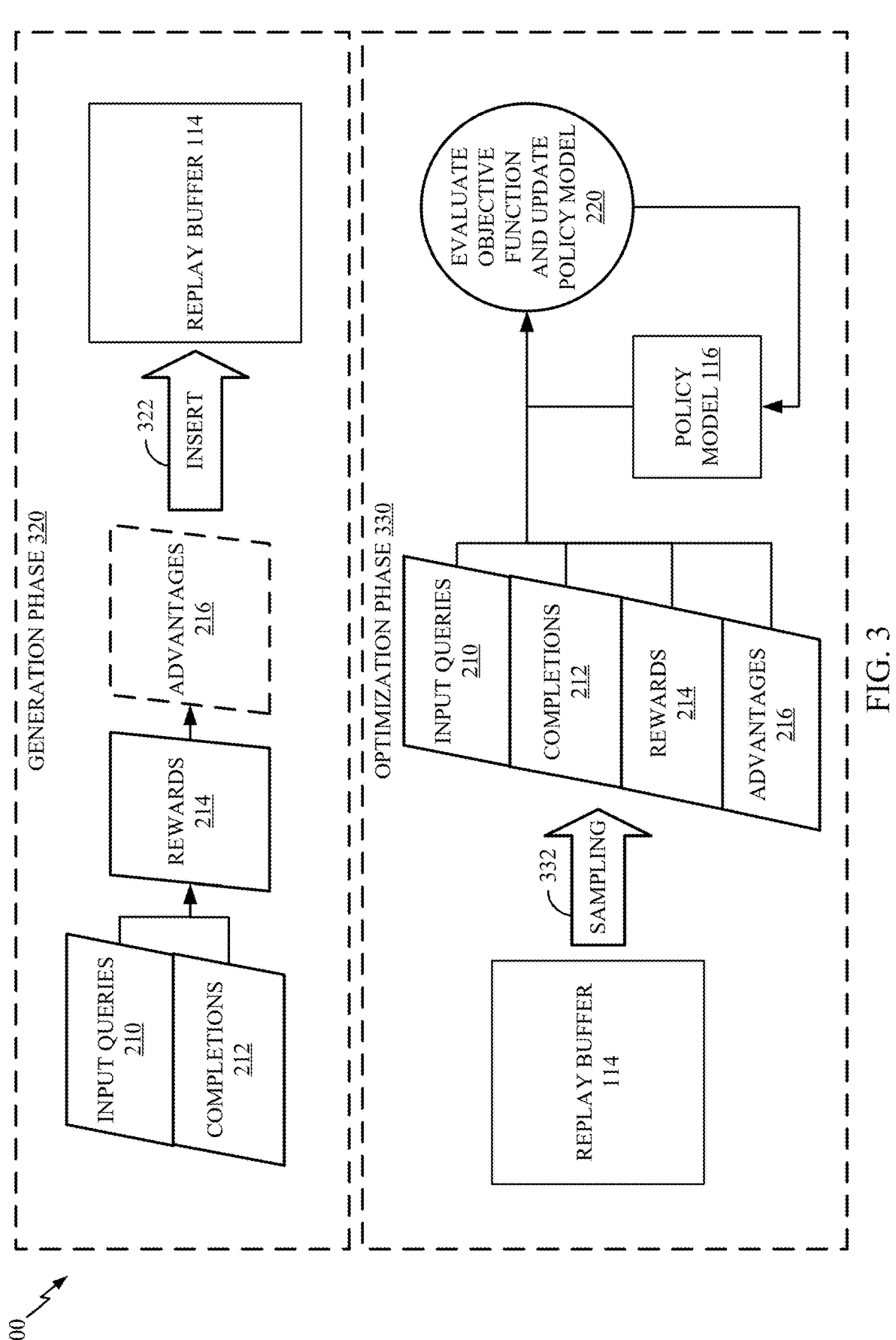
FIG. 3 is an illustration of improved techniques for optimizing a policy model in a reinforcement learning framework according to aspects of the present disclosure.

FIG. 3 is an illustration 300 of improved techniques for optimizing a policy model within a reinforcement learning framework according to aspects of the present disclosure. For example, illustration 300 may depict an improved GRPO technique in which the generation and optimization phases are decoupled, leading to technical improvements with respect to prior techniques, such as those described above with respect to FIG. 2. Illustration 300 includes policy model 116 and replay buffer 114 of FIG. 1, as well as input queries 210, completions 212, rewards 214, advantages 216, and step 220 of FIG. 2.

Illustration 300 is a schematic representation of a "Replay-GRPO" framework, illustrating two distinct phases of operation: the generation phase 320 and the optimization phase 330. Generation phase 320 begins with input queries 210, which are processed to generate completions 212, such as using policy model 116 as described above. These completions 212 are evaluated, such as using reward model 113 of FIG. 1, to produce rewards 214. Subsequently, in some aspects, advantages 216 are computed based on these rewards 214. Alternatively, advantages 216 may be computed during optimization phase 330. The advantage computation process involves determining the relative performance of each output completion within a group, based on the scalar reward values assigned to those completions. The computed advantage reflects the relative performance of an output completion compared to the average performance of the group (e.g., based on scalar rewards). A positive advantage indicates that the output completion performed better than the average, while a negative advantage suggests it performed worse.

In one example, the advantage for each output completion is computed using normalized reward differences, which can be expressed in terms of a formula as follows: for each output completion (o_i) in a group of output completions, the advantage (A_i) may be calculated as: [A_i=r_i– \frac{1}{G} \sum_{j=1}^{G} r_j], where: (r_i) is the scalar reward value assigned to the output completion (o_i), (G) is the total number of output completions in the group, and (\sum_{j=1}^{G} r_j) represents the sum of scalar reward values for all output completions in the group. The computed advantage (A_i) (e.g., one of advantages 216) reflects the relative performance of the output completion (o_i) (e.g., one of completions 212) compared to the average performance of the group (e.g., all of completions 212, or at least all of completions 212 that correspond to one input query 210 in some embodiments). A positive advantage indicates that the output completion performed better than the average, while a negative advantage suggests it performed worse. This advantage computation is subsequently utilized (e.g., during optimization phase 330) to guide the optimization of the policy model, enabling it to learn from past performance and improve its ability to generate high-quality output completions in future iterations.

The input queries 210, completions 212, and rewards 214, and in some aspects advantages 216 (e.g., if advantages 216 are computed at generation phase 320), are inserted at step 322 into the replay buffer 114 for storage, such as in one or more tuples.

For example, each tuple stored in replay buffer 114 may comprise the following elements: an input query (e.g., one of input queries 210 derived from the task distribution), one or more output completions (e.g., one or more of the completions 212 generated by the policy model for the input query, where each output completion represents a potential response or action that the policy model can take based on the input query), scalar reward values of the one or more output completions (e.g., the numerical reward 214 value assigned by the reward model to each output completion that is stored in this tuple), log probabilities of the one or more output completions (e.g., the log probability, such as output by the policy model, associated with each output completion that is stored in this tuple, with the log probabilities indicating the likelihood of the policy model generating each specific output completion given the input query), and/or advantages of the one or more output completions (e.g., if advantages are computed during generation phase 320). In some aspects each tuple includes a single output completion for a given query (e.g., meaning that the multiple output completions for a given query will be stored in multiple tuples), while in other aspects each tuple may include multiple output completions for a given query. It is noted that tuples are included as an example, and other forms of data storage are possible without departing from the scope of the present disclosure. The elements stored in replay buffer 114 collectively enable the system to perform multiple optimization steps (e.g., multiple instances of optimization phase 330) from the same data (e.g., including at least partially overlapping sets of data from replay buffer 114), enhancing training efficiency and reducing computational costs.

Expressed formulaically, replay buffer $\mathcal{B}$ may have a total capacity of B entries. Each entry (e.g., tuple) in the buffer may contain a group of G samples that share the same input query q, generated by policy model $\pi_{\theta_k}$. For each sample $i \in \{1, \ldots, G\}$ in group j, the following may be stored: $q^j$ (e.g., the input query), $$o_i^j$$

(e.g., the generated output for input query), $$r_i^j$$

(e.g., the scalar reward), and $$\log \pi_{\theta_k}^j (o_i^j \mid q^j)$$

(e.g., the log-probability of generated output under the policy model that generated it).

In the optimization phase 330, the replay buffer 114 is accessed at sampling 332 to sample a group of stored tuples. For example, the stored tuples may include input queries 210, completions 212, rewards 214, and/or advantages 216. Alternatively, advantages 216 may be computed at optimization phase 330 based on rewards 214 (e.g., in the manner described above with respect to generation phase 320 or otherwise). The sampled tuples (and, in some aspects, advantages computed based on the sampled tuples) are utilized to evaluate an objective function and update the policy model at step 220. One or more parameters of the policy model 116 may be modified based on the evaluation, facilitating the optimization of the policy model parameters.

Expressed formulaically, at each training step (e.g., each instance of the optimization phase), a batch of N groups (e.g., tuples) is sampled independently from the replay buffer to compute a gradient update. Let denote the set of these sampled groups, such that $|\mathcal{N}|=N$. Then, in each optimization step an average over N groups is determined. Let $j \in \mathcal{N}$.

For example, step 220 may receive the advantages 216 and the policy model 116 and may facilitate the modification of the policy model parameters to produce an optimized version of the policy mode 116. The updated policy model 116 may then be fed back into the system to continue the optimization process and/or for use in generating new responses to requests from clients.

For instance, for each query (e.g., representative of an input query 210) in a set of queries Q (e.g., representative of all of input queries 210), the system samples a group of outputs (e.g., representing all or a subset of completions 220) from the old policy (e.g., the reference version of policy model 116 prior to optimization) and then optimizes the policy model (e.g., representing a candidate optimized version of policy model 116) by maximizing an objective function (e.g., at step 220). In an example, the objective function is represented as:

$$\mathcal{J}_{Replay-GRPO}(\theta) = \mathbb{E}\left[\left\{q^j, o_i^j, r_i^j, \log \pi_{\theta_k}^j\left(o_i^j \mid q^j\right)\right\} \sim \mathcal{B}\right]$$

$$\frac{1}{N}\sum_{j \in N}\left[\frac{1}{G}\right.$$

$$\sum_{i=1}^{G}\left(\min\left(\frac{\pi_\theta\left(o_i^j \mid q^j\right)}{\exp\left(\log \pi^j\left(o_i^j \mid q^j\right)\right)}A_i^j, \text{clip}\left(\frac{\pi_\theta\left(o_i^j \mid q_j\right)}{\exp\left(\log \pi_k^j\left(o_i^j \mid q^j\right)\right)}, 1-\epsilon, 1+\epsilon\right)A_i^j\right) -$$

$$\left.\beta \mathbb{D}_{KL}\left(\pi_\theta\left(\cdot \mid q^j\right) \| \pi_{ref}\left(\cdot \mid q^j\right)\right)\right)\right]$$

In the above equation, $J_{Replay-GRPO}(\theta)$ represents the objective function, $\mathbb{E}$ is the expected value (e.g., a statistical measure that represents the average outcome of a random variable, weighted by the probabilities of each possible outcome), $\epsilon$ and $\beta$ are hyper-parameters, and $$A_i^j$$

is the advantage for each sample (e.g., computed related to the group), computed using a group of rewards corresponding to the outputs within each group:

$$A_i^j = \frac{r_i^j - \frac{1}{G}\sum_{l=1}^{G} r_l^j}{\sqrt{\frac{1}{G}\sum_{l=1}^{G}\left(r_l^j - \frac{1}{G}\sum_{m=1}^{G} r_m^j\right)^2}},$$

where i and m may be index variables.

$\mathbb{D}_{KL}(\pi_\theta(\bullet|q)\|\pi_{ref}(\bullet|q))$ represents a KL regularization term for computing the KL divergence between the current policy $\pi_\theta$ and reference policy $\pi_{ref}$ and may be computed over the query $q^j$ as:

$$\mathbb{D}_{KL}(\pi_\theta(\cdot \mid q) \| \pi_{ref}(\cdot \mid q)) = \sum_{o \in O_q} \pi_{ref}(o \mid q)\log\left(\frac{\pi_{ref}(o \mid q)}{\pi_\theta(o \mid q)}\right)$$

The above equation can be estimated using a sampled subset of outputs o for each q. Because the log-probability $$\log \pi_k^j\left(o_i^j \mid q^j\right)$$

under the policy model is stored in the replay buffer, the importance sampling ratio can be computed directly as:

$$\frac{\pi_\theta\left(o_i^j \mid q^j\right)}{\exp\left(\log \pi_k^j\left(o_i^j \mid q^j\right)\right)} = \exp\left(\log \pi_\theta\left(o_i^j \mid q^j\right) - \log \pi_k^j\left(o_i^j \mid q^j\right)\right),$$

thereby avoiding the need to recompute old policies. In some aspects, exp represents an exponential function.

The importance sampling ratio may be used through clipped importance sampling to adjust the contribution of each sample in the replay buffer during the optimization phase, ensuring that the optimization process accounts for the likelihood of each sample under the current policy model compared to the policy model that generated the sample. Mathematically, the importance sampling ratio may be expressed as the ratio of the probability of an output completion under the current policy model (e.g., the candidate optimized policy model) to the probability of the same output completion under the policy model that generated it. This ratio may be computed using the log probabilities stored in the replay buffer without the need to recompute the probabilities under the reference policy model.

The importance sampling ratio may be used to weight the contribution of each sample during the computation of the objective function, allowing the optimization process to correct for any discrepancies between the current and previous policy models. This process, which may be referred to as clipped importance sampling ensures that the optimization process remains unbiased and that the policy model is updated effectively based on the stored data.

Clipped importance sampling is a technique used to ensure stability and robustness in the optimization process of a policy model. It involves adjusting the contribution of each sample from the replay buffer during the optimization phase by weighting them according to their importance sampling ratio. This ratio is calculated as the probability of an output completion under the current policy model divided by the probability of the same output completion under the policy model that generated it. By clipping this ratio within a specified range, the method prevents excessively large updates that could destabilize the learning process. This clipping ensures that the optimization process remains unbiased and that the policy model is updated effectively based on the stored data, thereby maintaining the integrity of the learning process and contributing to more reliable policy model updates.

Illustration 300 effectively demonstrates the decoupling of the generation and optimization processes, allowing for asynchronous execution. This separation enables multiple optimization steps from the same data stored in the replay buffer 114, enhancing training efficiency and reducing computational costs. The use of independent schedulers for each phase is implied, allowing for flexible and adaptive learning schedules.

In the context of the disclosed technology, independent schedulers may play a crucial role in managing the execution of the generation and optimization phases within the Replay-GRPO framework. The use of independent schedulers enables the generation and optimization phases to operate asynchronously and at different frequencies or conditions. This separation is instrumental in enhancing the flexibility and efficiency of the training process.

The independent schedulers may be responsible for determining when each phase should be executed based on predefined criteria or adaptive learning schedules. For instance, the scheduler for the generation phase may be configured to trigger the generation of new output completions at specific intervals or when certain conditions are met, such as when the replay buffer requires additional data to maintain a diverse set of samples, when a threshold amount of time has passed since a previous generation phase, when a threshold amount of data has been sampled from the replay buffer, and/or the like. Conversely, the scheduler for the optimization phase may be set to initiate optimization steps at different intervals or when different conditions occur, potentially more frequently or otherwise differently than the generation phase, to maximize the reuse of stored data in the replay buffer.

By allowing the generation and optimization phases to be controlled independently, the system can optimize resource allocation and adapt to varying computational demands. This flexibility is particularly beneficial in large-scale machine learning model training, where computational efficiency and training speed are critical. The independent schedulers enable the system to balance the need for fresh data generation with the efficient reuse of existing data, thereby improving overall training performance and scalability.

Samples from the replay buffer may be overlapping across different optimization phases. This overlap occurs because the replay buffer stores tuples comprising input queries, output completions, scalar reward values, and log probabilities, which can be reused in multiple optimization steps. During each optimization phase, a group of stored tuples is sampled from the replay buffer to compute advantages and update the policy model. The replay buffer's capacity to store a diverse set of samples allows for the possibility that the same tuples, or subsets thereof, may be selected in different optimization phases. This overlapping of samples across optimization phases enables the system to leverage previously generated data, enhancing training efficiency and reducing computational costs by minimizing the need for fresh inferences at each optimization step. The reuse of overlapping samples ensures that the optimization process can benefit from a broader range of data, contributing to more robust and effective policy model updates.

A policy model optimized through techniques described herein may be used to generate responses to provide to clients with improved accuracy and quality, and with a shorter and more efficient training process, as compared to policy models optimized using prior techniques.

The differences between techniques described herein and conventional GRPO techniques may be seen from the following algorithmic comparison.

For conventional GRPO, the inputs are the initial policy model $\pi_{\theta_{init}}$; reward model(s) $r_\varphi$; task prompts $\mathcal{D}$; hyperparameters $\varepsilon$, $\beta$, $\mu$; policy model $\pi_\theta \leftarrow \pi_{\theta_{init}}$; iteration=1, . . . , l; reference model $\pi_{ref} \leftarrow \pi_\theta$; and step=1, . . . , M. The algorithm may involve sampling a batch $\mathcal{D}_b$ from $\mathcal{D}$, updating the old policy model $\pi_{\theta_{old}} \leftarrow \pi_\theta$, sampling G outputs $$\{o_i\}_{i=1}^{G} \sim \pi_{\theta_{old}}(\cdot \,|\, q)$$

for each query $q \in \mathcal{D}_b$, computing rewards $$r_i\}_{i=1}^{G}$$

for each sampled output $o_i$ by running $r_\varphi$, and computing $\hat{A}_{i,t}$ for the t-th token of $o_i$ through group relative advantage estimation. GRPO iteration=1, . . . , $\mu$. The algorithm may then involve updating the policy model $\pi_\theta$ by maximizing the GRPO objective function and updating $r_\varphi$ through continuous training using a replay mechanism. The output of the conventional GRPO algorithm is $\pi_\theta$.

By contrast, for certain improved GRPO techniques described herein, the inputs include initial policy model $\pi_{\theta_{init}}$; reward model $r_\varphi$; task prompts $\mathcal{D}$; hyperparameters $\varepsilon$, $\beta$, $\mu$; replay buffer $\mathcal{B}$ with capacity B; and generation frequency K. The algorithm may involve Initializing the policy model: $\pi_\theta \leftarrow \pi_{\theta_{init}}$, initializing replay buffer $\mathcal{B} \leftarrow \emptyset$, initializing the optimization step counter: $t \leftarrow 0$, initializing iteration k=1, . . . , l, setting reference model: $\pi_{ref} \leftarrow \pi_\theta$, and setting generation model: $\pi_{\theta_k} \leftarrow \pi_\theta$. The algorithm may involve t mod K=0, sampling a batch of prompts $\mathcal{D}_b$ from $\mathcal{D}$, generating samples (e.g., GenerateSamples $\pi_{\theta_k}$, $\mathcal{D}_b$, $r_\varphi$, $\mathcal{B}$) at a generation phase, and optimizing the policy model (e.g., OptimizePolicy $\pi_\theta$, $\pi_{ref}$, $\mathcal{B}$, $\mu$) at an optimization phase, and then proceeding to $t \leftarrow t+1$. The output of the algorithm is optimized policy $\pi_\theta$. The generation of samples may be represented as GenerateSamples ($\pi_{\theta_k}$, $\mathcal{D}_b$, $r_\varphi$, $\mathcal{B}$), involving, for each $q \in \mathcal{D}_b$, generating G outputs $$\{o_i^j\}_{i=1}^{G} \sim \pi_{\theta_k}(\cdot \,|\, q),$$

computing rewards $$\{r_i^j\}_{i=1}^{G}$$

via $r_\varphi$, computing $$\log \pi_{\theta_k}(o_i^j \,|\, q)$$

for each i, and storing group $$\{(q^j, o_i^j, r_i^j, \log \pi_{\theta_k}(o_i^j \,|\, q^j))\}_{i=1}^{G}$$

in buffer $\mathcal{B}$.

In some aspects optimizing the policy may be represented as OptimizePolicy($\pi_\theta$, $\pi_{ref}$, $\mathcal{B}$, $\mu$), which may involve, for each optimization step=1, . . . , $\mu$, sampling N groups $\mathcal{N} \subset \mathcal{B}$, each group $j \in \mathcal{N}$, and computing an advantage for $$i \in \{1, \ldots, G\} : A_i^j = \frac{r_i^j - \mathrm{mean}(\{r_1^j, \ldots, r_G^j\})}{std(\{r_1^j, \ldots, r_G^j\})},$$

computing Replay-GRPO loss $J_{Replay\text{-}GRPO}(\theta)$ using sampled groups, and updating $\pi_\theta$ via gradient ascent.

The improved GRPO techniques represented by the algorithm above offer several advantages over the conventional GRPO algorithm. These improvements primarily stem from the introduction of a replay buffer mechanism and the decoupling of the generation and optimization phases, which address key inefficiencies present in the conventional approach.

Firstly, the replay buffer mechanism allows for the storage and reuse of grouped outputs, rewards, and log-probabilities across multiple optimization steps. This capability effectively reduces sample waste, as it minimizes the need for fresh inferences at each optimization step. By reusing previously generated data, the system enhances training efficiency and reduces computational costs, which are significant limitations of the conventional GRPO algorithm.

Secondly, the decoupling of the generation and optimization phases enables asynchronous execution, allowing these phases to operate independently. This separation facilitates multiple optimization steps from the same data stored in the replay buffer, further improving training speed and computational efficiency. The use of independent schedulers for each phase allows for flexible and adaptive learning schedules, optimizing resource allocation and improving overall performance.

The improved GRPO techniques incorporate clipped importance sampling and KL regularization, which contribute to more robust and effective policy model updates. These techniques ensure that the optimization process remains unbiased and that the policy model is updated effectively based on the stored data.

KL regularization, also known as Kullback-Leibler divergence regularization, is a technique used to maintain the stability of policy model updates by penalizing deviations from a reference policy. In the context of the disclosed technology, KL regularization may be applied during the optimization phase to ensure that the updated policy model does not diverge excessively from a predefined reference policy model. This regularization is achieved by incorporating a penalty term into the objective function, which quantifies the divergence between the probability distributions of the current policy model and the reference policy model. The KL divergence measures the difference between these distributions, and the penalty term is designed to minimize this divergence, thereby encouraging the updated policy model to remain close to the reference policy. By applying KL regularization, the optimization process is guided to produce more stable and reliable policy model updates, reducing the risk of overfitting and enhancing the generalization capabilities of the model. This technique is particularly beneficial in reinforcement learning frameworks, where maintaining a balance between exploration and exploitation is crucial for effective learning.

Overall, the improved GRPO techniques provide a more efficient and scalable training process, particularly beneficial for large-scale machine learning model training, such as LLM fine-tuning. The enhancements in training speed, sample reuse, and computational efficiency make the improved GRPO techniques superior to the conventional GRPO algorithm.

Example Operations for Optimizing a Policy Model in a Reinforcement Learning Framework FIG. 4 depicts example operations 400 related to optimizing a policy model in a reinforcement learning framework. For example, operations 400 may be performed by one or more components described above with respect to FIG. 1, such as policy model optimization engine 112 of FIG. 1, by one or more components of system 500B of FIG. 5B described below, and/or one or more other components.

Operations 400 begin at step 402, where an input query is determined from a task distribution. This step may involve selecting a query that will be used to generate outputs in subsequent steps.

At step 404, a plurality of output completions for the input query is generated using a first version of the policy model. This involves the policy model producing multiple possible completions or responses to the input query, which will be evaluated in the next step.

Step 406 involves evaluating the plurality of output completions using a reward model to assign scalar reward values. Each output completion is assessed by the reward model based on certain criteria, and a numerical reward value is assigned to quantify its effectiveness or quality.

In step 408, the process stores, in a replay buffer, one or more tuples comprising the input query, the output completions, the scalar reward values, and log probabilities of the plurality of output completions. This storage allows for the reuse of data in future optimization steps, enhancing efficiency.

Step 410 involves sampling a group of stored tuples, including the one or more tuples, from the replay buffer. This step selects specific data from the buffer to be used in the computation of advantages in the next step. Sampling strategies may vary, and may involve overlapping samples across multiple optimization phases.

At step 412, the method computes, based on the scalar reward values and the log probabilities, an advantage for each output completion in the group of stored tuples relative to other output completions in the group using normalized reward differences. This computation helps in determining which outputs are more favorable compared to others. The advantage computation may be performed during the generation phase (and the advantages may be stored in the replay buffer) or may be performed at the optimization phase based on data sampled from the replay buffer.

Finally, step 414 involves automatically modifying one or more parameters of the policy model based on the computed advantages to produce a second version of the policy model. This step may involve updating the policy model to improve its performance based on the insights gained from the computed advantages.

In some aspects, a generation phase comprising the generating of the plurality of output completions and the evaluating of the plurality of output completions is performed as a separate asynchronous phase from an optimization phase comprising the automatically modifying of the one or more parameters of the policy model based on the computed advantages to produce the second version of the policy model. The separation of the generation phase from the optimization phase allows for asynchronous execution, where the generation of output completions and their evaluation can be performed independently of the optimization process. This decoupling enables multiple optimization steps to be conducted without necessitating new inferences at each step, thereby improving training speed, sample reuse, and computational efficiency.

Certain aspects further comprise using independent schedulers to control frequencies with which the generation phase and the optimization phase are performed. Independent schedulers enable the system to manage the execution of the generation and optimization phases separately, allowing for flexible and adaptive learning schedules. This configuration optimizes resource allocation and improves overall performance by allowing the system to adapt to varying computational demands.

Some aspects further comprise: after the automatically modifying of the one or more parameters of the policy model, sampling a different group of stored tuples, including the one or more tuples, from the replay buffer; computing a respective advantage for each output completion in the different group of stored tuples relative to other respective output completions in the different group of stored tuples using corresponding normalized reward differences; and automatically modifying one or more respective parameters of the policy model based on the computed respective advantages to produce a third version of the policy model. The ability to sample different groups of stored tuples from the replay buffer for subsequent optimization steps allows for continued refinement of the policy model. By computing respective advantages for each output completion in the newly sampled group and modifying the policy model parameters accordingly, the system iteratively enhances the model's performance.

Certain aspects comprise calculating a loss using clipped importance sampling based on the computed advantages, wherein the automatically modifying of the one or more parameters of the policy model is based on the calculated loss. For example, clipped importance sampling may be used to calculate a loss that guides the modification of the policy model parameters. This technique ensures that the optimization process remains unbiased and that the policy model is updated effectively based on the stored data.

In certain aspects, the calculating of the loss comprises applying a regularization penalty with respect to the first version of the policy model. Applying a regularization penalty during the loss calculation helps maintain the stability of the policy model updates by penalizing deviations from the first version of the policy model. This regularization contributes to more robust and effective policy model updates.

In some aspects, the policy model comprises a machine learning model, and the automatically modifying of the one or more parameters of the policy model is part of a supervised learning process for training the policy model. For example, the policy model, as a machine learning model, may undergo parameter modifications as part of a supervised learning process. This process may involve iteratively adjusting the model's parameters to minimize loss and improve accuracy, thereby enhancing the model's ability to generate high-quality output completions.

In certain aspects, the machine learning model is a language processing machine learning model, and the plurality of output completions comprises a plurality of natural language responses generated by the language processing machine learning model based on the input query. For example, The policy model, as a language processing machine learning model, may generate natural language responses as output completions. These responses may be evaluated and optimized to improve the model's performance in generating contextually relevant and accurate language outputs.

In some aspects, the log probabilities are output by the first version of the policy model in connection with the generating of the plurality of output completions. The log probabilities associated with each output completion may be generated by the first version of the policy model. These probabilities may be stored in the replay buffer and used in the computation of advantages, contributing to the optimization of the policy model.

Example Computing Systems

Figure 5A:
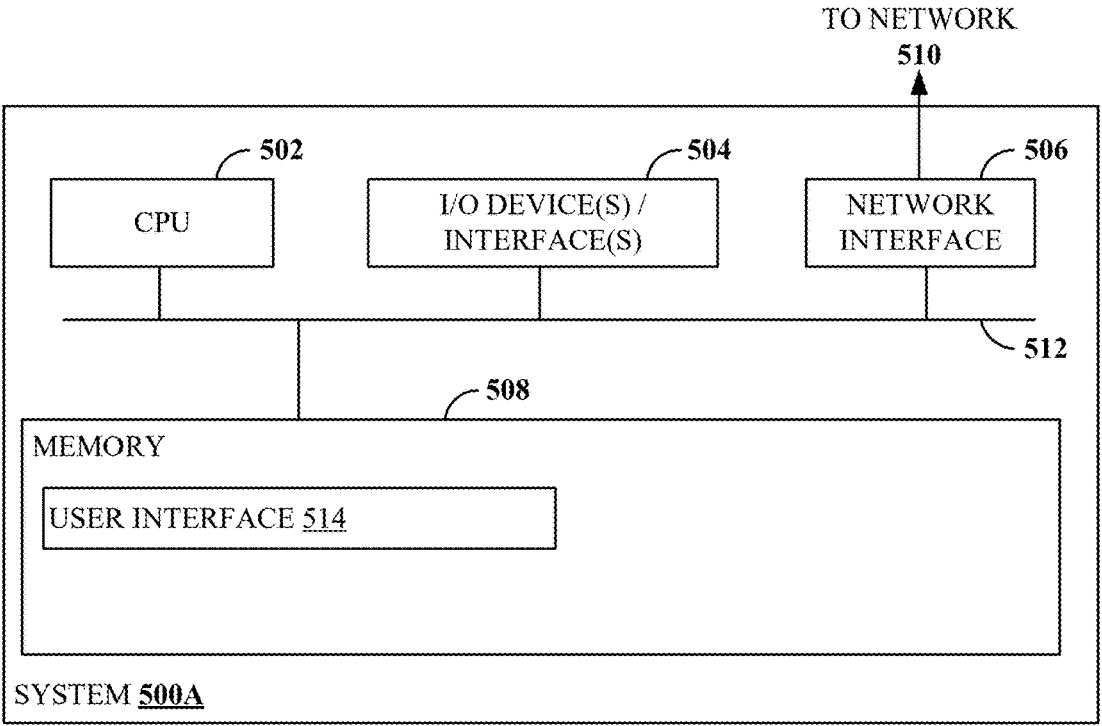
FIG. 5A is a block diagram of a computing system related to optimizing a policy model in a reinforcement learning framework.

FIG. 5A illustrates an example system 500A with which embodiments of the present disclosure may be implemented. For example, system 500A may be configured to perform one or more of operations 400 of FIG. 4. In one example system 500A corresponds to server 110 of FIG. 1.

System 500A includes a central processing unit (CPU) 502, one or more I/O device interfaces 504 that may allow for the connection of various I/O devices 504 (e.g., keyboards, displays, mouse devices, pen input, etc.) to the system 500A, network interface 506, a memory 508, and an interconnect 512. It is contemplated that one or more components of system 500A may be located remotely and accessed via a network 510. It is further contemplated that one or more components of system 500A may comprise physical components or virtualized components.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, and memory 508. CPU 502 is included to be representative of a single CPU, multiple CPUs, a single CPU having multiple processing cores, and other arrangements.

Additionally, the memory 508 is included to be representative of a random access memory or the like. In some embodiments, memory 508 may comprise a disk drive, solid state drive, or a collection of storage devices distributed across multiple storage systems. Although shown as a single unit, the memory 508 may be a combination of fixed and/or removable storage devices, such as fixed disc drives, removable memory cards or optical storage, network attached storage (NAS), or a storage area-network (SAN).

As shown, memory 508 includes a user interface 514, which may be representative of user interface 122 of FIG. 1. For example, a user may interact with user interface 514 to request content or information, review and/or provide feedback with respect to automatically generated content or information, and/or the like. Feedback received from the user with respect to content or information generated using a policy model optimized using techniques described herein may be used as training data to re-train the policy model (e.g., in a subsequent optimization phase).

Figure 5B:
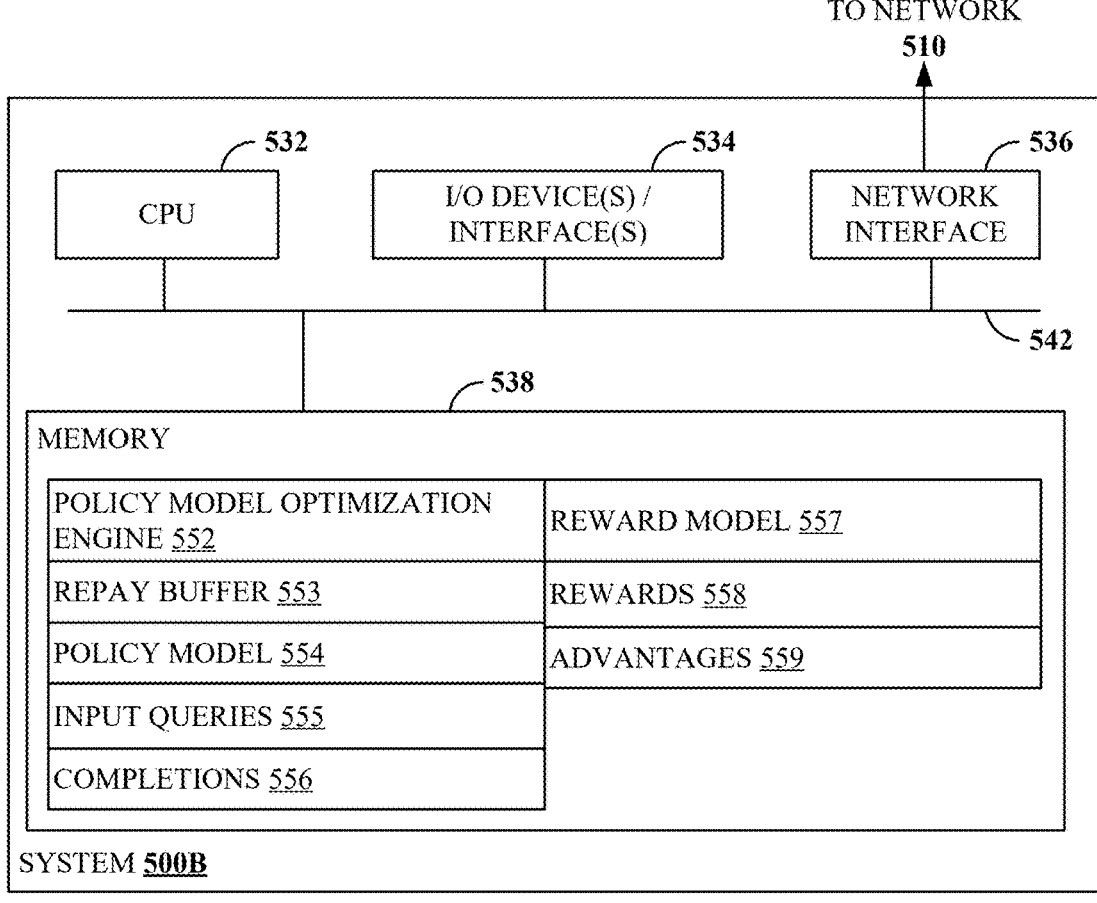
FIG. 5B is a block diagram of a computing system related to optimizing a policy model in a reinforcement learning framework.

FIG. 5B illustrates another example system 500B with which embodiments of the present disclosure may be implemented. For example, system 500B may correspond to client 120 of FIG. 1, and may be configured to perform one or more of operations 400 of FIG. 4.

System 500B includes a CPU 532, one or more I/O device interfaces 534 that may allow for the connection of various I/O devices 534 (e.g., keyboards, displays, mouse devices, pen input, etc.) to the system 500B, network interface 536, a memory 538, and an interconnect 542. It is contemplated that one or more components of system 500B may be located remotely and accessed via a network 510. It is further contemplated that one or more components of system 500B may comprise physical components or virtualized components.

CPU 532 may retrieve and execute programming instructions stored in the memory 538. Similarly, the CPU 532 may retrieve and store application data residing in the memory 538. The interconnect 542 transmits programming instructions and application data, among the CPU 532, I/O device interface 534, network interface 536, and memory 538. CPU 532 is included to be representative of a single CPU, multiple CPUs, a single CPU having multiple processing cores, and other arrangements.

Additionally, the memory 538 is included to be representative of a random access memory or the like. In some embodiments, memory 538 may comprise a disk drive, solid state drive, or a collection of storage devices distributed across multiple storage systems. Although shown as a single unit, the memory 538 may be a combination of fixed and/or removable storage devices, such as fixed disc drives, removable memory cards or optical storage, network attached storage (NAS), or a storage area-network (SAN).

As shown, memory 538 includes policy model optimization engine 552, replay buffer 553, policy model 554, and reward model 557, which may be representative of policy model optimization engine 112, replay buffer 114, policy model 116, and reward model 113 of FIG. 1. Memory 538 further includes input queries 555 and completions 556, which may include input queries 210 and completions 212 of FIGS. 2 and 3. Memory 538 further includes rewards 558 and advantages 559, which may include rewards 214 and advantages 216 of FIGS. 2 and 3.

It is noted that systems 500A and 500B are included as examples, and certain functionality described with respect to systems 500A and/or 500B and/or otherwise described herein may be implemented via more or fewer devices and/or components.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples.

For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for optimizing a policy model in a reinforcement learning framework, comprising:

performing an instance of a generation phase based on a first schedule configured by a first scheduler that controls scheduling of instances of the generation phase, wherein the first schedule results in the instances of the generation phase being initiated at a first frequency, wherein the first scheduler triggers the instance of the generation phase based on determining an amount of data that has been sampled from a replay buffer, and wherein the performing of the instance comprises:

determining an input query from a task distribution;

generating a plurality of output completions for the input query using a first version of the policy model;

evaluating the plurality of output completions using a reward model to assign scalar reward values; and storing, in the replay buffer, one or more tuples comprising the input query, the output completions, the scalar reward values, and log probabilities of the plurality of output completions; and performing a respective instance of an optimization phase based on a second schedule configured by a second scheduler that controls scheduling of respective instances of the optimization phase, wherein the second schedule results in the respective instances of the optimization phase being initiated at a second frequency that is higher than the first frequency, wherein at least two of the instances of the optimization phase involve sampling a same stored tuple from the replay buffer to form at least two different groups used in the at least two of the instances of the optimization phase, and wherein the performing of the respective instance comprises:

sampling a group of stored tuples, including the one or more tuples, from the replay buffer;

computing, based on the scalar reward values and the log probabilities, an advantage for each output completion in the group of stored tuples relative to other output completions in the group of stored tuples using normalized reward differences; and automatically modifying one or more parameters of the policy model, based on the computed advantages to produce a second version of the policy model.

2. The method of claim 1, further comprising:

after the automatically modifying of the one or more parameters of the policy model, sampling a different group of stored tuples, including the one or more tuples, from the replay buffer;

computing a respective advantage for each output completion in the different group of stored tuples relative to other respective output completions in the different group of stored tuples using corresponding normalized reward differences; and automatically modifying one or more respective parameters of the policy model based on the computed respective advantages to produce a third version of the policy model.

3. The method of claim 1, further comprising calculating a loss using clipped importance sampling based on the computed advantages, wherein the automatically modifying of the one or more parameters of the policy model is based on the calculated loss.

4. The method of claim 3, wherein the calculating of the loss comprises applying a regularization penalty with respect to the first version of the policy model.

5. The method of claim 1, wherein the policy model comprises a machine learning model, and wherein the automatically modifying of the one or more parameters of the policy model is part of a supervised learning process for training the policy model.

6. The method of claim 5, wherein the machine learning model is a language processing machine learning model, and wherein the plurality of output completions comprises a plurality of natural language responses generated by the language processing machine learning model based on the input query.

7. The method of claim 1, wherein the log probabilities are output by the first version of the policy model in connection with the generating of the plurality of output completions.

8. A system for optimizing a policy model in a reinforcement learning framework, comprising:

one or more processors;

a memory storing instructions that, when executed by the one or more processors, cause the system to:

perform an instance of a generation phase based on a first schedule configured by a first scheduler that controls scheduling of instances of the generation phase, wherein the first scheduler triggers the instance of the generation phase based on determining an amount of data that has been sampled from a replay buffer, wherein the first schedule results in the instances of the generation phase being initiated at a first frequency, and wherein the performing of the instance comprises:

determining an input query from a task distribution;

generating a plurality of output completions for the input query using a first version of the policy model;

evaluating the plurality of output completions using a reward model to assign scalar reward values; and storing, in the replay buffer, one or more tuples comprising the input query, the output completions, the scalar reward values, and log probabilities of the plurality of output completions; and perform a respective instance of an optimization phase based on a second schedule configured by a second scheduler that controls scheduling of respective instances of the optimization phase, wherein the second schedule results in the respective instances of the optimization phase being initiated at a second frequency that is higher than the first frequency, wherein at least two of the instances of the optimization phase involve sampling a same stored tuple from the replay buffer to form at least two different groups used in the at least two of the instances of the optimization phase, and wherein the performing of the respective instance comprises:

sampling a group of stored tuples, including the one or more tuples, from the replay buffer;

computing, based on the scalar reward values and the log probabilities, an advantage for each output completion in the group of stored tuples relative to other output completions in the group of stored tuples using normalized reward differences; and modifying one or more parameters of the policy model, based on the computed advantages to produce a second version of the policy model.

9. The system of claim 8, wherein the instructions, when executed by the one or more processors, further cause the system to:

after the modifying of the one or more parameters of the policy model, sample a different group of stored tuples, including the one or more tuples, from the replay buffer;

compute a respective advantage for each output completion in the different group of stored tuples relative to other respective output completions in the different group of stored tuples using corresponding normalized reward differences; and modify one or more respective parameters of the policy model based on the computed respective advantages to produce a third version of the policy model.

10. The system of claim 8, wherein the instructions, when executed by the one or more processors, further cause the system to calculate a loss using clipped importance sampling based on the computed advantages, wherein the modifying of the one or more parameters of the policy model is based on the calculated loss.

11. The system of claim 10, wherein the calculating of the loss comprises applying a regularization penalty with respect to the first version of the policy model.

12. The system of claim 8, wherein the policy model comprises a machine learning model, and wherein the modifying of the one or more parameters of the policy model is part of a supervised learning process for training the policy model.

13. The system of claim 12, wherein the machine learning model is a language processing machine learning model, and wherein the plurality of output completions comprises a plurality of natural language responses generated by the language processing machine learning model based on the input query.

14. The system of claim 8, wherein the log probabilities are output by the first version of the policy model in connection with the generating of the plurality of output completions.

15. A non-transitory computer-readable medium storing instructions that, when executed by one or more processors of a computing system, cause the computing system to:

perform an instance of a generation phase based on a first schedule configured by a first scheduler that controls scheduling of instances of the generation phase, wherein the first scheduler triggers the instance of the generation phase based on determining an amount of data that has been sampled from a replay buffer, wherein the first schedule results in the instances of the generation phase being initiated at a first frequency, and wherein the performing of the instance comprises:

determining an input query from a task distribution;

generating a plurality of output completions for the input query using a first version of a policy model;

evaluating the plurality of output completions using a reward model to assign scalar reward values; and storing, in the replay buffer, one or more tuples comprising the input query, the output completions, the scalar reward values, and log probabilities of the plurality of output completions; and perform a respective instance of an optimization phase based on a second schedule configured by a second scheduler that controls scheduling of respective instances of the optimization phase, wherein the second schedule results in the respective instances of the optimization phase being initiated at a second frequency that is higher than the first frequency, wherein at least two of the instances of the optimization phase involve sampling a same stored tuple from the replay buffer to form at least two different groups used in the at least two of the instances of the optimization phase, and wherein the performing of the respective instance comprises:

sampling a group of stored tuples, including the one or more tuples, from the replay buffer;

computing, based on the scalar reward values and the log probabilities, an advantage for each output completion in the group of stored tuples relative to other output completions in the group of stored tuples using normalized reward differences; and modifying one or more parameters of the policy model, based on the computed advantages to produce a second version of the policy model.

*    *    *    *    *